No. 881,571. PATENTED MAR. 10, 1908.
H. E. GOLDBERG.
CALCULATING MACHINE.
APPLICATION FILED MAR. 26, 1906.
4 SHEETS—SHEET 1.
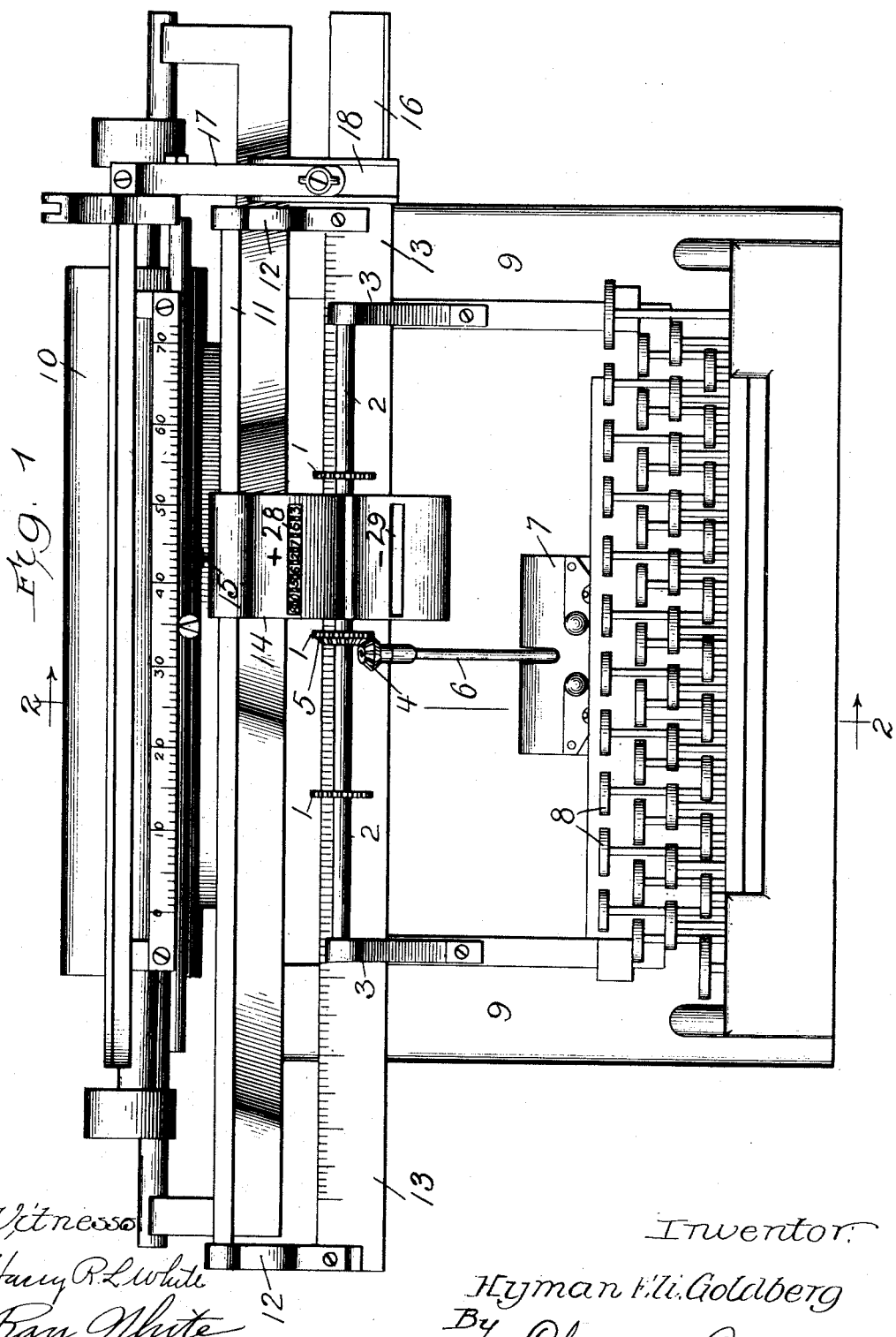
Witnesses
Harry R. L. White
Ray White
Inventor:
Hyman E. Li. Goldberg
By Cheever & Cox
Att'ys

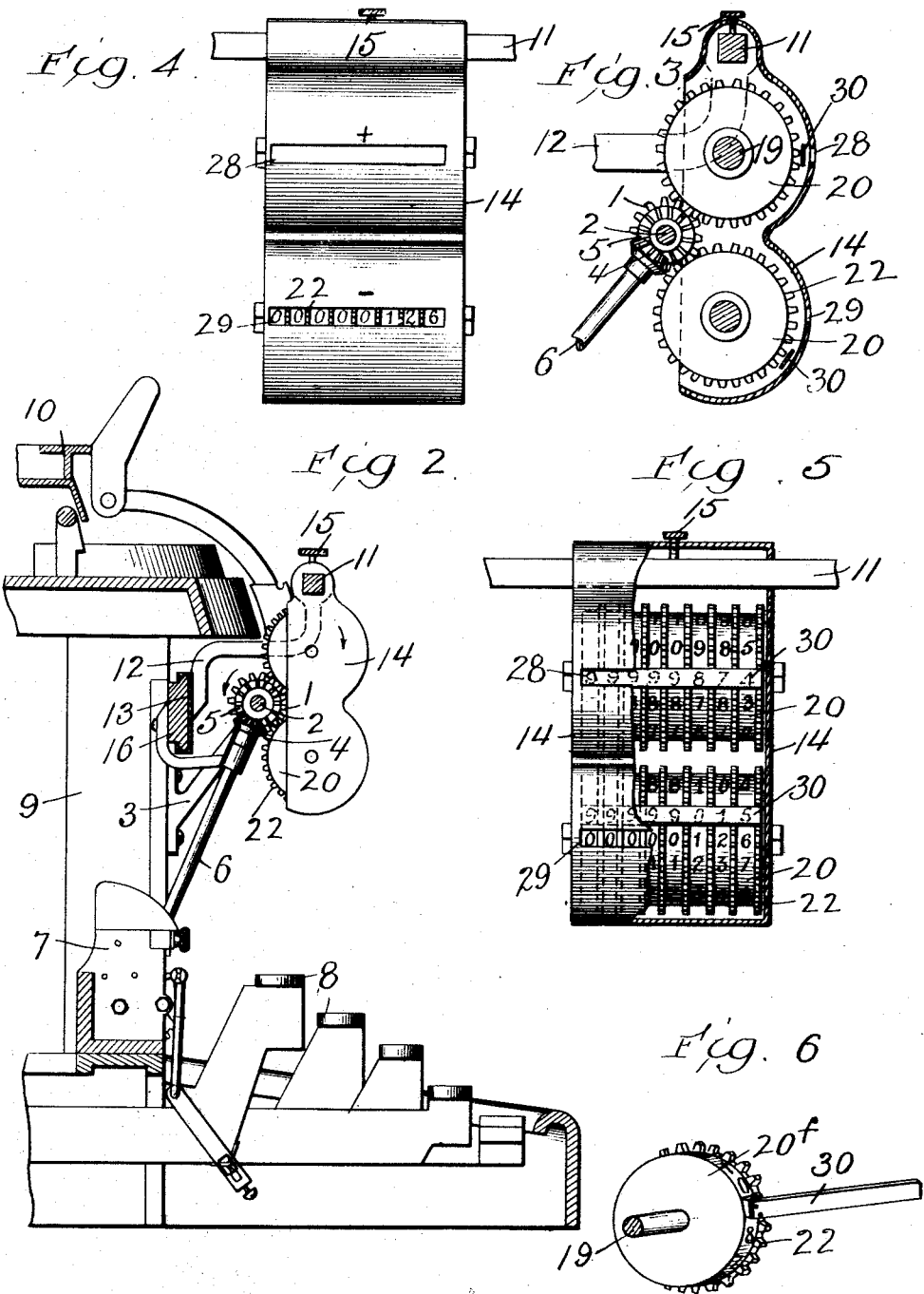

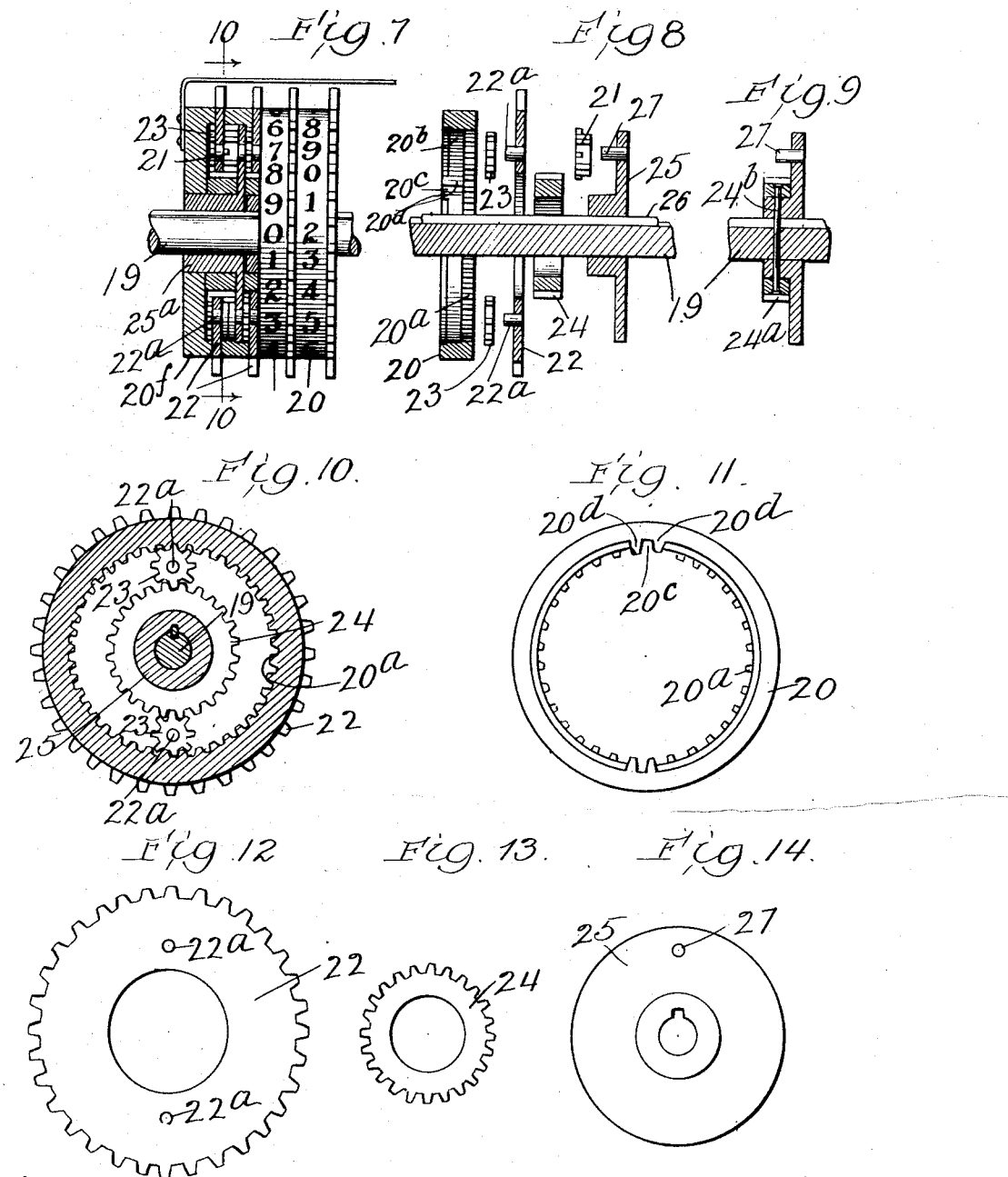

No. 881,571. PATENTED MAR. 10, 1908.
H. E. GOLDBERG.
CALCULATING MACHINE.
APPLICATION FILED MAR. 26, 1906

4 SHEETS—SHEET 4.

Witnesses:
Harry R. Lewhite
Ray White.

Inventor:
Hyman Eli Goldberg.
By Cheever & Cox
Attys

UNITED STATES PATENT OFFICE.

HYMAN ELI GOLDBERG, OF CHICAGO, ILLINOIS, ASSIGNOR TO GOLDBERG CALCULATING MACHINE COMPANY, A CORPORATION OF ILLINOIS.

CALCULATING-MACHINE.

No. 881,571.   Specification of Letters Patent.   Patented March 10, 1908.

Application filed March 26, 1906. Serial No. 308,049.

*To all whom it may concern:*

Be it known that I, HYMAN ELI GOLDBERG, a citizen of the United States, residing at Chicago, in the county of Cook and State of Illinois, have invented a certain new and useful Improvement in Calculating-Machines, of which the following is a specification.

This invention relates to calculating machines including calculating attachments to typewriters and is more particularly concerned with the register or totalizing mechanism, the manner in which it is operated by the valuating or differential mechanism, and the means for indicating whether the number exhibited is a plus or minus quantity.

In the most common computations the results are positive quantities, representing something more than zero. When such computations are done mechanically, the results appear upon the figure wheels or other figure indicators of the machine, and are to be taken as positive quantities. But in some form of commercial and banking accounts, the results may be at times positive and at other times negative, and for such conditions it becomes desirable to provide means for indicating to the operator whether he is to consider the visible number as a positive or a negative quantity.

The object of this invention is to provide such indicating means in connection with a totalizer adapted to exhibit positive and negative quantities.

The general plan of carrying out the invention in its present form is to provide two sets of figure wheels, one representing positive and the other negative quantities, and providing means for temporarily covering with a screen or shutter the reading line of the set which is not to be read.

Figure 15:
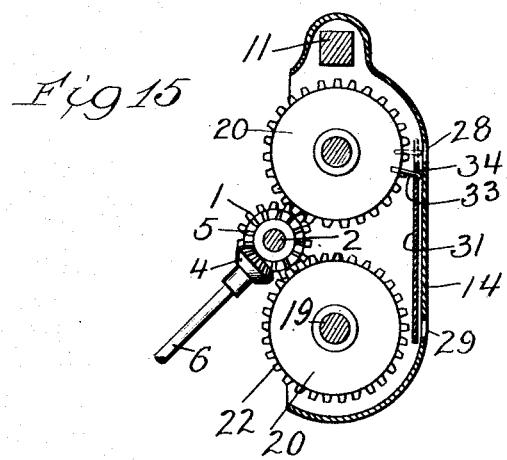
Figure 16:
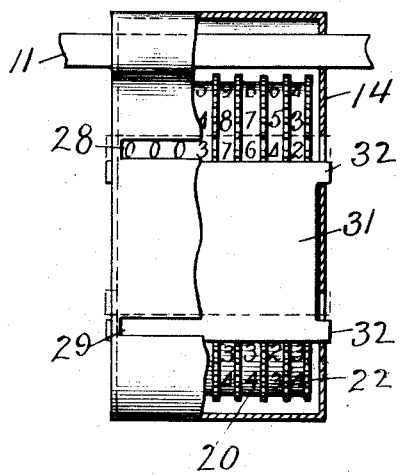
Figure 17:
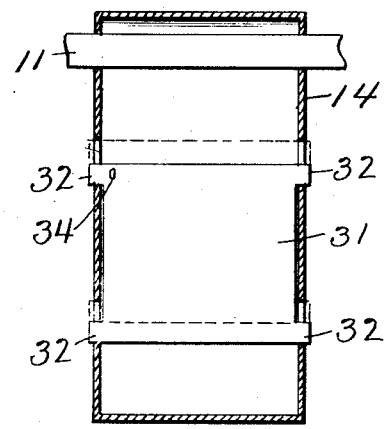

I obtain my object by the mechanism illustrated in the accompanying drawings in which Figure 1 is a general front view of a typewriter attachment embodying my invention. Fig. 2 is transverse vertical section taken on the line 2—2 Fig. 1. Fig. 3 is a transverse vertical section of the double totalizer showing the position of the master wheel relative thereto. Fig. 4 is a front or face view of the totalizer showing the positive figure wheels covered and the negative wheels exhibiting the number 126 thus indicating that the number exhibited is —126. Fig. 5 is a front view of the totalizer showing a portion of the cover removed. Fig. 6 is a perspective view of the highest one of the figure wheels and its adjacent gear. Fig. 7 is an assembly view partly in section showing totalizer wheels. Fig. 8 is a view of a group of parts illustrating their coöperative relationship. Fig. 9 is a sectional view of the intermediate wheel located farthest to the right on the totalizer. Fig. 10 is a sectional view taken on line 10—10 Fig. 7. Figs. 11, 12, 13, 14 are side views of component parts of the totalizer. Fig. 15 is a transverse vertical section of a modified and preferred form of totalizer showing a single screen or shutter adapted to cover, one at a time, the reading lines of both totalizers. Fig. 16 is a front view of the parts in Fig. 15 showing the housing partially broken away. Fig. 17 is a front sectional elevation through the housing showing the manner of mounting the shutter therein.

Similar numerals refer to similar parts throughout the several views.

The master or setting wheels 1 rotate amounts depending upon the value of the digit to be registered and serve to operate the totalizer. In the present drawings a plurality of these master wheels is shown, each of them rigid upon a common rotatable shaft 2 mounted in suitable stationary brackets 3 or otherwise. A plurality of master wheels is required for certain kinds of accounts, but as far as the present invention is concerned the principle of construction and operation may be completely illustrated in connection with a single master wheel. In the construction shown, the shaft 2 and master wheels 1 are rotated by means of a bevel pinion 4 meshing with a bevel gear 5 on the side of one of the master wheels.

Although this invention is not concerned with the construction of the mechanism for imparting the proper amount of rotation to the master wheels, I have, in order to show a complete machine, indicated that the pinion 4 is rotated by a shaft 6 which in turn is operated by a digitizing or differential mechanism 7 connected to and operated by the figure keys 8 of a typewriter. The typewriter here shown has a stationary frame work 9 and a traveling carriage 10. The form of the digitizing or differential mechanism here indicated is described in detail in Patent No. 782,554 issued to me February 14, 1905.

The totalizer travels in unison with the carriage, and although various means for accomplishing this may be employed, in the present design it is mounted upon bar 11 carried by the brackets 12 from the slide 13. The totalizer housing 14 which incloses and supports the totalizer parts, fits over bar 11 in such manner as to prevent the swinging of the totalizer about said bar as an axis. Any suitable construction will suffice so long as the totalizer is held rigidly to its path in such manner that the totalizer wheels will come properly into mesh with the master wheels in passing them. In order that the totalizer may be adjusted to and held at the proper point along bar 11, a set screw 15 or equivalent device is employed. Slide 13 travels along the stationary guide bar 16 which is arranged parallel with the direction of travel of the carriage; and the movement of the carriage is imparted to said slide by means of an arm 17 depending from the carriage and fitting into the socket 18 attached to said slide.

As best shown in Figs. 1 to 5, the totalizing mechanism comprises two totalizers, mounted preferably in a single housing 14. In the simplest, and hence. the preferred construction the totalizers are operated directly from the master wheel without the interposition of intermediate gears. The figures upon the figure wheels of the totalizers are so arranged that for the same motion of the master wheel, one totalizer adds and the other subtracts. In order to produce such effect, the figures progress in opposite directions if the figure wheels rotate in the same direction, as in the design here shown, but they would progress in the same direction if the figure wheels should be designed to be rotated in opposite directions.

The type of totalizer here shown is described in detail in Patent No. 782,605 issued to me February 14, 1905, and a brief description thereof will be sufficient for the present purpose. In each totalizer the parts are carried upon a main shaft 19 which is non rotatably supported in the side walls of the housing 14.

Referring more particularly to Figs. 6 to 14 inclusive, each totalizer comprises a plurality of sets or groups consisting of five principal parts, to wit: the totalizing wheels 20, the carrying pinions 21, the accumulating wheels 22, the epicyclic pinions 23 and the intermediate wheels 24. Wheels 20, 22 and 24 are all freely rotatable about shaft 23 independently thereof with the exception of wheel 24ª located at the extreme right to correspond with the units column. This wheel is rigidly fastened to shaft 19 by means of a pin 24$^b$ (shown in Fig. 9) although any other means may be substituted for holding it rigid and non rotatable. The function of said wheel 24ª is to form a fixed basis of reference or foundation for the mechanism from which the rotatable parts move their definite amounts.

In each group of parts, 25 represents a disk-like supporting piece secured to the shaft 19 by means of a spline 26. Said supporting piece has at its left portion a hub 25ª which is cylindrical in form and forms a bearing whereon the intermediate wheel 24 is freely rotatable. The pin 27 extends toward the left from said supporting piece 25 and serves as an axle whereon the carrying pinion 21 is freely rotatable. Said pinion has four long and four short teeth alternating with each other for alternately being locked and rotated by the totalizing wheels 20 as hereinafter described.

The totalizers may be constructed with one or more than one series of figures on each totalizing wheel but in the construction here shown which for structural reasons is preferred, there are, on each totalizing wheel two series of figures each series running from "0" to "9", thus making 20 figures each 1/20 of a circumference apart. Said wheels have formed on their right portion an internal forty-toothed gear 20ª best shown in Figs. 8 and 10, and to the left of said gear portion 20ª is an internal cylindrical surface 20$^b$ which constitutes a locking ring for locking the carrying pinion 21. Each totalizing wheel has two slots or spaces 20$^c$ located diametrically opposite to each other, each slot having a projecting carrying tooth 20$^d$ at each side thereof for engaging said carrying pinion. The construction is such that the carrying teeth 20$^d$ of the wheel 20 will engage the short teeth of pinion 21 and rotate the same two steps or spaces, after which the locking ring 20$^b$ will enter between two long adjacent teeth on the pinion 21 and lock the same. During the rotation of the locking pinion the space 20$^c$ will permit the rotation of the carrying pinion by receiving one of the long teeth thereof. Thus when the totalizing wheel 20 is rotated it will, twice during each complete rotation, impart a partial rotary movement to its carrying pinion to carry the tens. Each totalizing wheel 20 is supported by the contact of its internal cylindrical surface or locking ring 20$^b$ upon the cylindrical edge of the supporting piece 25. Said wheel is thus freely rotatable independently of piece 25 and remains at all times concentric with shaft 19. The totalizing wheel 20$^b$ and supporting piece 25ª (shown at the extreme left of Fig. 7) are slightly modified to illustrate the form which these parts will take to impart a workmanlike appearance to the highest or extreme left part of the totalizer.

The accumulating-wheels 22 are plain thirty-two toothed spur gears having a comparatively large central aperture so that they may set over and be freely rotatable upon the points of the teeth of the intermediate-wheels 24. Said accumulating wheels are narrow and their teeth project beyond the circumference of the totalizing-wheels 20, so that they may be engaged by the master wheels 1.

Extending toward the left from each accumulating-wheel 22 are the pins 22$^a$ which constitute axles upon which the epicyclic pinions 23 are freely rotatable; they are designed to remain at all times in mesh with both the intermediate-wheel 24 and the internal gear-wheel 20 for transmitting rotation from the former to the latter. Each intermediate-wheel 24 is a wide faced twenty-four toothed spur gear having a full complement of teeth, and when in position in the hub 25$^a$, remains permanently in mesh with the carrying pinion 21, so that any rotation of said pinion would impart rotation to said intermediate-wheel. Said intermediate-wheel also remains permanently in mesh with the epicyclic pinions 23 aforesaid and the relationship of the parts is such that the pinion 23 engages the left portion of wheel 24, while the pinion 21 engages the right portion thereof, and the accumulating-wheels 22 occupy an intermediate position. The function of said intermediate wheels is to transmit rotation from the carrying pinions 21 to epicyclic pinions 23 and through said epicyclic pinions to the accumulating wheels 22.

From the above description it will be apparent that the rotating of the accumulating wheels will cause the rotation of the figure wheels in the same manner as in any other totalizer. Moreover each totalizer is reversible in the sense that the accumulating wheels may be rotated in either direction.

It will be understood that the actual construction of the totalizing wheels is not an essential feature of this invention and that totalizers having other specific constructions may be substituted. For example the form of totalizer shown in Patent No. 741,961 issued to me October 20, 1903 might be adapted for use in this connection by those skilled in the art. It will also be understood that although it is advantageous to have the numerals upon the totalizing wheels themselves, it is not necessary that said totalizing wheels perform the double function of carrying and directly exhibiting the numerals. The totalizing wheels would be "provided" with numerals even if they operated separate numeral bearing members.

The housing 14 has two sight apertures 28 and 29 at the reading lines of the two totalizers through which the numbers set up thereon may be read. Let it be supposed that the numbers on the upper totalizer are to be positive quantities and the ones of the lower totalizer negative quantities.

Reference will first be had to the form of shutters shown in Figs. 1 to 5. Fastened to the highest totalizing wheels 20$^f$ (which are also the figure wheels in this construction), are the screens or shutters 30 which extend to the right completely across the totalizers and when opposite to apertures 28 and 29, hide the figures from view. The location of the shutters, circumferentially, on wheel 20$^f$ is at the next figure space behind the "0," that is, just prior to the commencement of the series of figures, (in a decimal system opposite to the "9" as shown in Fig. 6) so that a shutter would be brought opposite to the sight aperture by rotating a wheel 20$^f$ negatively. In other words the totalizer wheels and shutters are so arranged that, on the positive or upper totalizer, "0" or any number above zero will be visible through the upper sight aperture, but any negative rotation from zero will immediately bring the shutter opposite to the said sight aperture and hide the upper positive totalizer figures from view: And inversely, on the negative or lower totalizer "0" or any number below zero will be visible through the lower sight aperture, but any plus or positive rotation from zero will immediately bring the lower shutter opposite to said lower sight aperture and hide the within figures from view. Thus, except when all of the figure wheels are at zero, only one set of figures will be visible at a time, and whether the visible numbers are positive or negative depends upon whether they appear through the upper or lower sight aperture.

The totalizing wheels 20$^f$ which support the screen or shutter are here illustrated as similar in construction to the figure wheels and are placed upon the same axle. This arrangement is not essential, however, and it is sufficient if the shutter be moved at the time when the highest totalizing wheel crosses the zero point.

It is obvious that as the wheels 22 of the different totalizers rotate simultaneously and in equal amounts, there is no reason why they could not be geared together.

In Figs. 15, 16 and 17 there is shown a modified and preferred form of totalizer screen or shutter and this form is preferred for the reason that a single shutter performs the function of the two shutters illustrated in the previous figures. With this preferred form all parts of the mechanism, excepting the housing are constructed the same as before and the housing is substantially the same. The shutter 31 however in the present instance is vertically arranged and is of sufficient height to extend from one set of figure wheels to the other. Its dimensions are such that when it is raised it will cover the upper sight aperture 28 and uncover the lower sight aperture 29 and when lowered, will cover the lower sight aperture 29 and uncover the upper sight aperture 28. Thus one or the other set of figure wheels are always covered at the reading line while the other set is uncovered and the operator is able to read from only one set of figure wheels at a time. The manner of mounting the shutter is immaterial, but in the shown design said shutter has wings or lugs 32 which are guided in vertical slots in the side of the housing.

Shutter 31 is operated from the highest wheel 20$^f$ of one of the totalizers in any suitable manner. In the present design the operative connection is made by means of a pin 33 projecting from wheel 20$^f$ of the upper totalizer and penetrating an aperture 34 in the shutter.

Although the present construction shows a plurality of master wheels and means for bringing the totalizer into engagement with them one after another I do not herein claim the same as these matters are claimed in my copending application filed May 28, 1904, Serial No. 210,158.

What I claim as new and desire to secure by Letters Patent is:

1. In a calculating machine the combination of a reversible totalizer having movable parts including numeral bearing members, actuating means therefor, and means operated by one of the movable parts of said totalizer for hiding the figures of the numeral bearing members at the reading line when the totalizer has been reversely operated beyond zero.

2. In a calculating machine the combination of a reversible totalizer embodying numeral bearing members; means for actuating said totalizer, and means operated by the numeral bearing member occupying the highest ordinal place thereof for hiding the numerals at the reading line when the totalizer has been reversely operated beyond zero.

3. In a calculating machine the combination of a reversible totalizer embodying totalizing wheels provided with figures; means for actuating said totalizing wheels, and a shutter operated by one of said totalizing wheel for covering the figures at the reading line when the wheel having the highest ordinal place value is rotated reversely beyond zero.

4. In combination, two totalizers, and a single differential mechanism adapted to operate both of them simultaneously and oppositely so that the amount added on one will be simultaneously subtracted on the other, and means operated by a part of one of the totalizers for indicating from which one of them the total should be read.

5. In combination, totalizing mechanism having a double set of totalizing wheels, means for operating both sets simultaneously in opposite directions one for addition and the other for subtraction; and means operated by one of said totalizing wheels for indicating where the total is to be read.

6. A totalizing mechanism having two sets of totalizing wheels adapted to exhibit two sets of numerals each at a different reading line, in combination with means for operating both sets simultaneously in opposite directions, one for addition and the other for subtraction; and a shutter, operated by one of said totalizing wheels for hiding one or the other set of numerals.

7. In combination, two totalizers, a single member adapted to operate them simultaneously one in a direction to add and the other in a direction to subtract; a differential mechanism for actuating said single operating member; two sets of figure wheels constituting a part of said totalizers and means operated by the highest figure wheel in one of said totalizers for indicating from which set of figure wheels the total should be read.

8. In combination, two totalizers, each having a set of figure wheels; a single differential mechanism adapted to operate both totalizers simultaneously and oppositely so that the amount added on one will be simultaneously subtracted on the other, a shutter adapted to hide at the reading line one set of figure wheels at a time, and means operated by an element of one of said totalizers for operating said shutter.

9. In combination, two reversible totalizers each having totalizing wheels provided with numerals and capable of rotating reversely through zero; a single differential mechanism adapted to operate both totalizers simultaneously and oppositely so that the amount added on one will be simultaneously subtracted on the other; a shutter for hiding the numerals at the reading lines, said shutter being adapted to exhibit one reading line of numerals at the time it is hiding the other line, and means operated by an element of one of said totalizers for operating said shutter.

10. In combination, two reversible totalizers each having totalizing wheels provided with numerals and capable of rotating reversely through zero; a single differential mechanism adapted to operate both totalizers simultaneously and oppositely so that the amount added on one will be simultaneously subtracted on the other; and a shutter capable of covering the reading line of only one totalizer at a time, said shutter being operatively connected to the left portion of one of the totalizers whereby the movement of the shutter will occur when the totalizing wheel having the highest ordinal place is moved.

11. In combination, two totalizers each including totalizing wheels provided with figures, the figures being arranged in opposing series so that the driving of the totalizing wheels in the same direction will cause one totalizer to add and the other to subtract; a differential mechanism adapted to drive the different totalizing wheels in the same direction for producing addition on one totalizer and subtraction on the other; the figures of the different totalizers being so arranged that when one totalizer is at zero the other will also be at zero; and a shutter capable of covering the reading line of only one totalizer at a time, said shutter being operatively connected to the left or highest totalizer wheel in such manner that said shutter will be moved when said wheel is moved backward from zero.

12. In combination, two totalizers each including totalizing wheels provided with figures, the figures on said figure wheel being arranged in opposing series so that the driving of the wheels in the same direction will cause one totalizer to add and the other to subtract; a differential mechanism adapted to drive the different wheels in the same direction for producing addition on one totalizer and subtraction on the other, the figures of the different totalizers being so arranged that when one is at zero the other will also be at zero; and a shutter capable of covering the reading line of only one totalizer at a time, said shutter being operatively connected to the left or highest portion of one of the totalizers at a point thereon corresponding to the "9" of the series of figures whereby the shutter will be moved to cover the reading line of any given totalizer when the totalizing wheel having the highest ordinal place in such totalizer is moved backward from zero.

13. In combination, a master wheel, means for operating it, and two totalizers adapted to be engaged by said master wheel simultaneously, said totalizers being oppositely arranged, whereby a given rotation of the master wheel will cause an addition on one totalizer and a like subtraction upon the other; and both of said totalizers being adapted to register above and below zero; and a shutter operated by the highest totalizing part of one of said totalizers for covering the reading lines thereof when such totalizer is actuated in its own particular negative direction, beyond zero.

14. In a calculating machine, the combination of two totalizers, each totalizer including totalizing wheels provided with figures, the figures on said wheels being arranged in opposing series so that the rotation of said wheels in the same direction will cause one totalizer to add and the other to subtract, and a differential mechanism adapted to operate the totalizing wheels of the different totalizers in the same direction for producing addition on one totalizer and subtraction on the other.

15. In a calculating machine, the combination, with a master wheel and its differential actuating mechanism, of a totalizing mechanism adapted to run from positive down to negative quantities and vice versa, said totalizing mechanism having two different sets of totalizing wheels each having figures whereby the total may be exhibited, and means operated from the highest totalizing wheel in one of the sets for hiding the figures on either set when they go below zero.

16. In combination, two traveling totalizers and a stationary differential mechanism adapted to operate both of them simultaneously, one in direction to add and the other in direction to subtract; a stationary bar, means slidingly but non-rotatively mounted upon said bar for supporting said totalizers, and means operated by the highest member of one of said totalizers for indicating from which totalizer the reading should be made.

17. In combination, two traveling totalizers and a stationary differential mechanism adapted to operate both of them simultaneously, one in direction to add and the other in direction to subtract; a stationary bar, a housing over said totalizer having a sight aperture therein at the reading line of each totalizer, said housing being slidingly but non-rotatively mounted upon said bar, and means operated by the highest part of a totalizer for closing the respective sight apertures when the respective totalizer wheels rotate beyond zero in a direction opposite to the one in which they rotate to make the exhibited digits increase.

18. In combination, a key operated typewriter having a stationary frame, a traveling carriage, a non traveling setting wheel, differential mechanism for operating the same, and two totalizers traveling in unison with the carriage and embodying wheels adapted to be rotated in either direction, as they come into mesh with the master wheel in traveling past it, said totalizers being so arranged that the rotation of a master wheel in any given direction will cause one totalizer to add and the other to subtract, and a shutter adapted to cover, one at a time, the figures of each totalizer, said shutter being operated by the highest operating part of a totalizer for indicating from which totalizer the resulting number should be read.

19. In combination, a key operated typewriter having a stationary frame, a traveling carriage, a non traveling setting wheel, differential mechanism for operating the same, and two totalizers traveling in unison with the carriage and embodying wheels adapted to rotate in either direction, and to come into mesh with the master wheel in traveling past it, said totalizers being so arranged that the rotation of a master wheel in any given direction will cause one totalizer to add and the other to subtract, and a shutter operated by the highest part of one of said totalizers for hiding the figure wheels of either of them at the reading line when such figure wheels progress in a reverse direction beyond zero.

20. In combination, two totalizers and a stationary differential mechanism adapted to operate both of them simultaneously, one in direction to add and the other in direction to subtract; a traveling bar, means slidingly but non-rotatively mounted upon said bar for supporting said totalizers, to bring them simultaneously into engagement with said differential mechanism and means for adjusting said totalizers lengthwise of said bar.

21. In a calculating machine, the combination of a master wheel and two totalizers adapted to travel relatively thereto to come into mesh therewith, said totalizers having a fixed path of travel and the parts of said totalizers being so arranged that the rotation of the master wheel in any given direction will produce addition in one totalizer and subtraction in the other.

22. In a calculating machine, the combination of a master wheel and two totalizers the parts of said totalizers being so arranged that the rotation of the master wheel in any given direction will produce addition in one totalizer and subtraction in the other.

23. In a calculating machine, a differential mechanism including a master wheel; in combination with two reversible totalizers adapted to be operated simultaneously by the same master wheel, said totalizers being oppositely arranged, whereby the rotation of said master wheel will cause addition on one totalizer and simultaneously cause subtraction upon the other.

24. A totalizing mechanism adapted to exhibit two rows of figures, means for operating the ordinal parts of said totalizing mechanism and means operated by a part of the totalizing mechanism of highest order to determine upon which row the total is to be found.

25. A totalizing mechanism embodying totalizing members provided with figures arranged to be exhibited in two rows, means for operating said members in combination with means controlled by the highest totalizing member for determining upon which of said rows of figures the total is to be found.

26. A totalizing mechanism having figure wheels adapted to show a plurality of horizontal rows of figures; in combination with means for screening all but the row which constitutes the proper result, said screening means including a part controlled by a member having the highest ordinal value in said totalizing mechanism.

In witness whereof, I have hereunto subscribed my name in the presence of two witnesses.

HYMAN ELI GOLDBERG.

Witnesses:
    HOWARD M. COX,
    DWIGHT B. CHEEVER.